(12) United States Patent
Mokdad et al.

(10) Patent No.: US 6,209,696 B1
(45) Date of Patent: Apr. 3, 2001

(54) FRICTION CLUTCH EQUIPPED WITH FLEXIBLE FLYWHEEL

(75) Inventors: Ayman Mokdad, Amiens; Bruno Hemeryck, Prouzel, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/402,169

(22) PCT Filed: Jan. 29, 1999

(86) PCT No.: PCT/FR99/00189

§ 371 Date: Feb. 17, 2000

§ 102(e) Date: Feb. 17, 2000

(87) PCT Pub. No.: WO99/39111

PCT Pub. Date: Aug. 5, 1999

(30) Foreign Application Priority Data

Jan. 30, 1998 (FR) .................................................. 98/01040

(51) Int. Cl.⁷ ...................................................... F16D 3/14
(52) U.S. Cl. ..................................... 192/30 V; 192/70.25; 192/207
(58) Field of Search ................................. 192/30 V, 200, 192/207, 70.25, 111 A

(56) References Cited

U.S. PATENT DOCUMENTS 5,515,745   5/1996   Tsuruta et al. .

FOREIGN PATENT DOCUMENTS

| 0385752 | 9/1990 | (EP) . |
| 0789153 | 1/1997 | (EP) . |
| 1257799 | 7/1961 | (FR) . |

OTHER PUBLICATIONS

Patent Abstracts of Japan, vol. 014, No. 339 (M–1001) & JP 02 118228 A, May 2, 1990.

*Primary Examiner*—Charles A Marmor
*Assistant Examiner*—Saul Rodriguez
(74) *Attorney, Agent, or Firm*—Liniak, Berenato, Longacre & White

(57) ABSTRACT

A friction clutch equipped with a flexible flywheel. The friction clutch has at least two natural resonant frequencies below a certain frequency. The ratio of a second resonant frequency relative to a first resonant frequency is at least 1.5. The friction clutch of the present invention reduces noise and increases useful life.

11 Claims, 2 Drawing Sheets

FRICTION CLUTCH EQUIPPED WITH FLEXIBLE FLYWHEEL

BACKGROUND OF THE INVENTION

1. Field of the Invention

The present invention relates to friction clutches including a flexible torque transmitting flywheel, especially for motor vehicles.

2. Description of Related Art

Related art flywheels include a flexible disc carrying a plate which is part of a friction clutch.

In that document the clutch with its flywheel is interposed in the transmission train going from the internal combustion engine to the unit that transmits motion to the wheels of the vehicle.

The disc comprises, firstly at its inner periphery, a first portion for coupling the friction clutch in rotation with the output shaft of the internal combustion engine of the vehicle, which in this case is the crankshaft of the engine, and secondly at its outer periphery, a second portion for supporting a plate which in one embodiment is the reaction plate.

Flexibility of the disc is such that, having regard to the inertia of the clutch, the natural frequency of the assembly lies in the range between fifty and two hundred hertz, and more precisely close to ninety hertz for a touring vehicle.

This natural frequency, referred to as a first frequency, is a bending frequency of the flywheel, with the disc then carrying out a nutation movement about its diameter.

Tests have shown the existence, above two hundred hertz, of a second natural frequency referred to as a pumping frequency, which is higher than the first frequency or so-called bending frequency.

It can result from this that the frequencies are coupled, with poor vibration absorption and the occurrence of noise.

An object of the present invention is to overcome these drawbacks in a simple and inexpensive way.

SUMMARY OF THE INVENTION

In accordance with the invention, the ratio of the second frequency with respect to the first frequency exceeds 1.5.

Coupling of the frequencies is thus avoided and a gentler solution is obtained.

Below this frequency, the disc becomes more flexible.

The disc is preferably so configured as to oppose the declutching force.

Thus, there is no danger of the disc being deformed. Further advantages will appear in the light of the description and in the light of the drawings.

Figure 1:
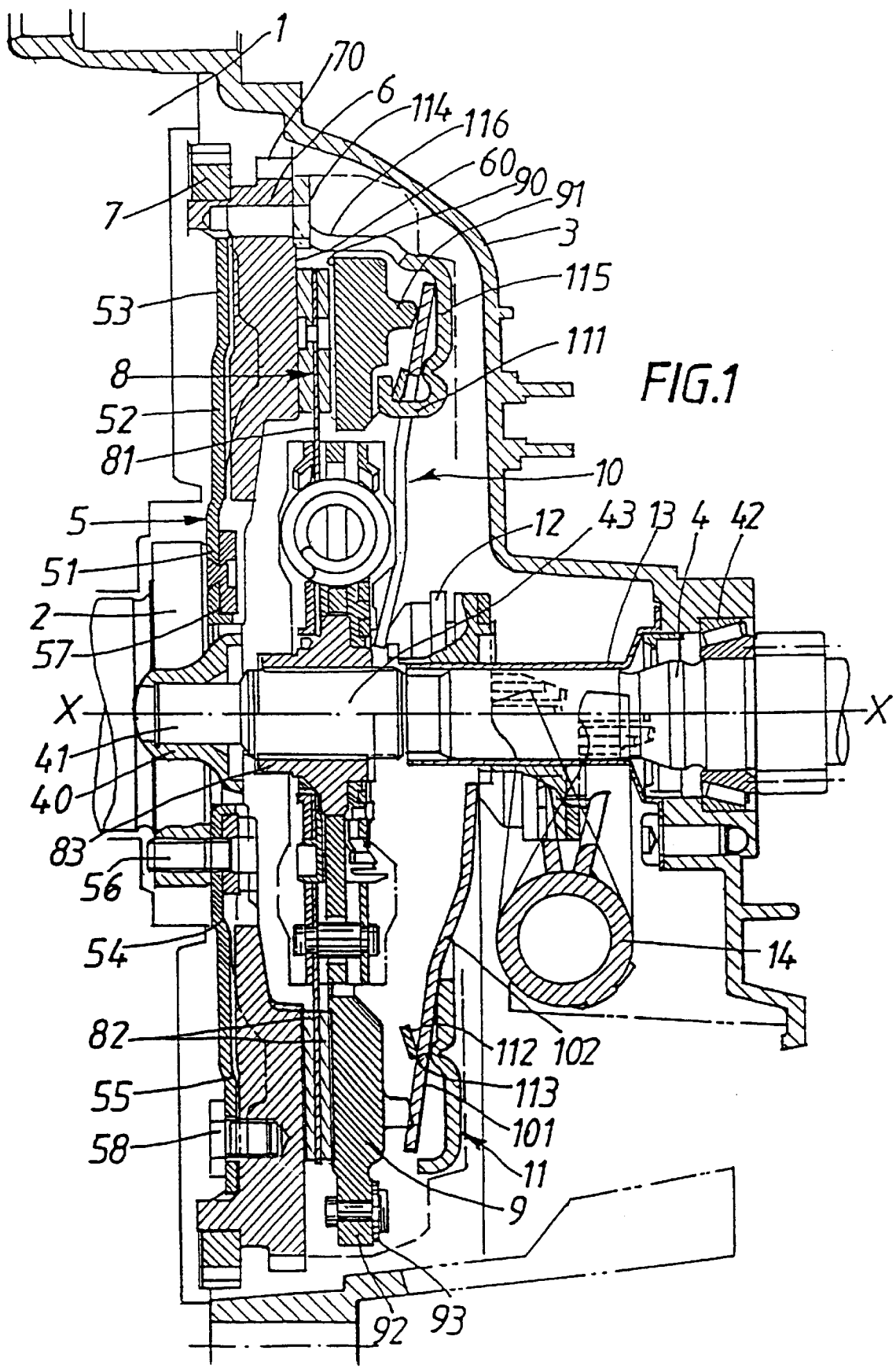
FIG. 1 is a view in axial cross section of a friction clutch having a flexible flywheel according to the invention.

The drawings show a friction clutch for a motor vehicle having an internal combustion engine, which has a casing 1 and a crankshaft 2 constituting a driving shaft. The casing 3 of a motion transmission unit, in this example a gearbox, is fixed on the casing 1 of the engine.

The said transmission unit includes an input shaft 4 which constitutes a driven shaft.

The shaft 4 extends through the casing 3 and has a free end 41 which is supported and centred by a centring bearing 40 carried by the crankshaft 2 and interposed operatively between the shaft 4 and the crankshaft. The shaft 4 is also supported and centred by a rolling bearing 42 which is carried internally by the casing 3.

The friction clutch works between the crankshaft 2, which constitutes the output part of the shaft of the vehicle engine, and the shaft 4. The said shaft 4 is located within the space bounded by the fixed casings 1, 3.

The clutch enables the driving shaft 2 to be coupled releasably and at will to the driven shaft 4, and includes a rotary driving flywheel in two parts 5, 6, a friction disc 8, a pressure plate 9, clutch engaging means 101, clutch disengaging means 102, and a cover plate 11 which has at its outer periphery fastening means 114 for fastening the cover plate to the drive flywheel 5, 6, which constitutes a torque transmitting flywheel. The cover plate 11 is hollow and includes a base portion 115 which has a central hole. The pressure plate 9 is coupled in rotation to the cover plate 11, while being able to be displaced axially.

The clutch engaging means 101 bear on the base portion 115 of the cover plate 11 so as to act on the pressure plate 9 and grip the friction disc 8 between the plate 9 and the drive flywheel 5, 6, which is fixed to the crankshaft 1 for rotation with the latter.

The friction disc 8 has at its outer periphery two friction liners 82 arranged on either side of a support disc 81, which is coupled to an internally splined hub 83 for coupling the friction disc 8 in rotation with the input shaft 4, and has for this purpose a portion 43 which is splined on the outside for cooperation with the splines of the hub 83.

In the known way, the liners 82 are secured, in this example by riveting, to the support 81 which in this example is divided at its outer periphery into blades which are elastic in the axial direction.

Thus, the liners 82 are adapted to be gripped axially in a progressive manner between the plate 9 and the flywheel 5, which in this example is flexible in the axial direction but rigid in the circumferential direction.

The liners 82 may of course be fixed directly by adhesive bonding on the blades, or on an element of elastic material which is itself adhesively bonded on the support 81. This support 81 can be doubled up, with a resilient element, such as a plurality of projecting elements or a block of elastomeric material, being interposed operatively between the two parts of the support 81, and with adhesive bonding or brazing of the liners on the outer faces of the parts of the support 81, in the manner described in the document FR-A-2 652 397, to which reference should be made for more detail.

The various ways for fastening the liners without fastening rivets are beneficial because they enable the liners to undergo a greater amount of wear for a given thickness of the liners 82.

The support 81 with its liners 82 constitutes the input element of the friction disc 8, and it is coupled either rigidly or elastically with the hub 83 which constitutes the output element of the friction disc. For example, the support 81 may be fixed at its inner periphery on a damper plate which is secured to the hub 83.

In this example, the support 83 is fixed to two guide rings which are disposed on either side of a hub plate.

These guide rings are connected together by means of spacers which extend axially through the hub plate.

Springs are mounted in windows which are formed in facing relationship with each other in the guide rings and the hub plate.

The support 81 is applied against one of the guide rings, and is secured to the latter by means of short posts, each of which extends with a circumferential clearance through an aperture in the hub plate. The hub plate may be connected rigidly to the hub 83.

In this example the hub plate meshes with the hub, and low stiffness springs are interposed operatively between the hub plate and the hub 83. Again, axially acting friction means are interposed operatively between the hub plate and the guide rings. For simplicity, none of the above mentioned components will be given reference numerals, because this type of friction disc 8 is described for example in the document FR-A-2 693 778, to which reference can be made for more detail.

That document also describes embodiments of the support disc for rendering the latter elastic in the axial direction, thereby making the friction disc progressive, given that the liners can be secured by adhesive bonding directly on the blades and/or the support tongues.

The flexible torque transmission flywheel comprises a disc 5 which carries at its outer periphery a plate 6, having a dorsal friction face 60 for the adjacent friction liner 82 of the friction disc 8.

The pressure plate 9 has a front friction face 90 for the other friction liner 82.

The plates 8 and 9 are made of a mouldable material, being in this example castings, while the disc 5 is of metal, being a sheet metal pressing in this example.

It is rigid in the circumferential sense and flexible in the axial sense.

As will have been understood, the plate 6 constitutes the reaction plate of the clutch, and the friction liners 82 are adapted to be gripped between the friction faces 60, 90 of the plates 6, 9. These faces 60, 90 are at right angles to the axial axis of symmetry X—X of the clutch, which is mounted for rotation when the engine is turning, about the axis X—X, given that the shafts 2 and 4 are, subject to fitting tolerances, aligned with each other and have the axis X—X as their axis of axial symmetry.

The friction liners 82 are therefore normally gripped between the plates 5, 6 under the action of the clutch engaging means 101,.

The clutch is therefore normally engaged, and the torque is transmitted from the engine shaft 2 (the crankshaft) to the driven shaft 4 (the input shaft) via the flexible torque transmitting flywheel 5, 6, given that the flexible disc 5 is fixed to the crankshaft 2 for rotation with the latter.

In this example, the cover plate 11 is in the form of a hollow dish, and the fastening means 114 consist of a radial flange which extends radially away from the axis X—X. This flange is formed with holes for fastening members to pass through them. To this end, the reaction plate 6 has, in correspondence with each hole of the flange 114, a threaded hole which in this example is blind. More precisely, the fastening means consist of screws, not shown, and in the upper part of FIG. 1 there can be seen a threaded hole (not given a reference numeral) which is in correspondence with a through hole (with no reference numeral) formed in the flange 114 for passage of the threaded portion of the screw through it so as to be then screwed into the threaded hole in the reaction plate 6.

In another version, the fastening means consist of rivets. In the present case, the flange 114 is joined to the base portion 115 of the cover plate 11 through an axially oriented annular skirt 116 which surrounds the pressure plate 9 and the liners 82 of the friction disc 8. The reaction plate 6 is flat. In a further version, the reaction plate 6 can of course have at its outer periphery an axially oriented annular skirt surrounding the friction liners 82 and, optionally, part of the pressure plate 9. In that case, the skirt 116 of the cover plate 11 is shorter in the axial direction.

In a further version of course, so as to create a module which includes the friction disc 8, the skirt of the cover plate is fixed directly, either detachably or non-detachably, on the reaction plate in the mariner described for example in the document DE-A-43 09 570. In that case, it can be seen that the starter crown can surround the skirt of the cover plate 11, as can be seen in FIG. 4 of that document DE-A-43 09 570. The skirt 116 of the cover plate may be secured by seaming to the reaction plate. For more detail, reference should be made to that document, the contents of which are considered to have been incorporated in the present application.

In this example, the clutch engaging means 101 and disengaging means 102 are of monobloc form, and are both part of a single annular member 10, which is of frusto-conical form in the free state. This member 10 is called a diaphragm, and has a continuous annular peripheral portion 101 in the form of a Belleville ring, which is extended radially inwards by a central portion divided into radial fingers 102 by slots.

The diaphragm 10 is mounted for tilting deflection on the cover plate 11, and more precisely on the flange 115 of the latter, as in the document FR-A-2 585 124. Thus, the base portion 115 of the cover plate 11 carries a primary abutment 113, which in this example is formed by stamping of the base portion 115, and has lugs 111 oriented axially and formed by pressing and bending of the base portion 115 of the cover plate 11, in this example a metal pressing.

These lugs 111 extend through widened apertures (with no reference numerals) formed at the inner periphery of the Belleville ring portion 101 of the diaphragm 10, formed with a central hole for the shaft 4 to extend through it.

These widened apertures constitute the bases of the blind slots which, in pairs, delimit the fingers 102 of the diaphragm 10. These fingers 102 constitute the declutching means of the clutch.

The free ends of the lugs 111, after having passed through the diaphragm 10, are bent radially away from the axis X—X, so as to form a mounting seat for a crown 112 which is configured at its outer periphery in such a way as to define a secondary abutment in facing relationship with the primary abutment 113.

The crown 112 is frusto-conical in form, and is engaged at its inner periphery on the axis lugs 111, being interposed between the bent free ends of the lugs and the diaphragm 10. The outer periphery of the Belleville ring portion 101 is engaged, when the clutch is engaged, that is to say when the liners 82 are gripped, on a divided annular boss 91 formed radially inwardly of the abutments 112, 113 on the back face of the pressure plate 9, which is coupled in a known manner to the cover plate 11 so as to be rotatable with the latter but movable axially with respect to it.

The inner periphery of the Belleville ring portion 101 is interposed between the primary abutment 113 and the secondary abutment 112, for tilting deflection. The cover plate 11 thus carries assembly means 111, 112, 113 for the tilting mounting of the diaphragm on the cover plate 11. These means may of course be in some other form, and may include posts fixed to the base portion 115 of the cover plate 11. These posts extend through the widened apertures in the diaphragm 10, and carry tilt fulcrum rings between which the diaphragm 10 is interposed.

The fulcrum rings constitute the primary and secondary abutments. That type of embodiment is shown in the document U.S. Pat. No. 3,299,735, which also shows the screws that fasten the flange of the cover plate to the reaction plate. Thus, as in that document, the flange 114 is pinched between the reaction plate 8 and the heads of the fastening screws.

In the document U.S. Pat. No. 3,299,735, the pressure plate has at its outer periphery lugs which constitute tenons, and which are engaged in axial sliding relationship in grooves which constitute mortices formed in the skirt of the cover plate. Thus, the pressure plate is coupled in rotation to the cover plate through a coupling of the tenon and mortice type which enables the pressure plate to be displaced axially. This type of coupling can be envisaged here.

Nevertheless, in FIG. 1, this coupling is made in a known way with the aid of axially elastic tongues 93.

Each of these tongues 93, which in this example are oriented tangentially, is fixed at one of its ends to a radial lug 92 which projects from the outer periphery of the pressure plate 9, while at its other end each tongue is fixed to a zone of the flange 114, the said zone being offset axially with respect to the portions of the flange 114 on which the heads of the fastening screws bear. The skirt 116 of the cover plate 11 is notched to allow passage of the lugs 92, with fastening of the tongues being obtained by riveting.

Thus the diaphragm 10, the pressure plate 9 and the cover plate 11 constitute a unitary assembly or so-called clutch mechanism, which is attached on the reaction plate 6. In this example the starter crown 7 is carried in the conventional way by the outer periphery of the plate 6, which also carries an ignition timing mark 70.

Control of disengagement of the clutch is obtained, in this example mechanically, with the aid of a clutch release bearing 12 which acts in a thrust mode on the inner end of the fingers 102 of the diaphragm, the clutch being of the push-to-release type. The said release bearing 12 is mounted for sliding movement in a guide tube 13 which is fixed on the casing 3, and through which the input shaft 4 passes. The release bearing 12 is acted on by a declutching fork 14 which is actuated by the clutch pedal via a cable transmission.

Given the foregoing, the upper part of FIG. 1 shows the disengaged (or declutched) condition of the clutch, in which the tongues 93 urge the plate 9 towards the base portion 115 of the cover plate 11, so as to release the liners 82, while in the lower part the Figure shows the clutch in its engaged or clutched condition, with the liners 82 being gripped.

When the clutch is disengaged, the torque is not transmitted to the driven shaft 4.

The release bearing 12 can of course be controlled hydraulically, and may for example be part of the receiver of a hydraulic concentric control unit.

In another version, displacement of the release bearing is controlled by an actuator governed by a computer in accordance with programs which are predetermined as a function of data obtained from sensors which, in particular, detect the rotational velocity of the shafts 2, 4 and the intention of the driver to change gear.

In general terms, and as explained in the document FR-A-1 257 799, control of gripping and releasing of the friction liners 82 may be of any appropriate type, for example mechanical and manual, or again with the aid of means which give total or partial automatic action, for example as a function of the speed of the crankshaft 2, and which may for instance be centrifugal means, pneumatic means, hydraulic means, magnetic means, electrical means, etc.

Similarly, the clutch may be of the pull-to-release type, as described in the document U.S. Pat. No. 3,583,537. In that case, the outer periphery of the Belleville ring portion of the diaphragm bears on the cover plate, while the inner periphery of the said Belleville ring portion bears on the boss of the pressure plate. In order to disengage the clutch, a pulling force is exerted with the aid of the clutch release bearing on the inner ends of the fingers of the diaphragm.

The diaphragm may of course be equipped with a wear compensating mechanism as described in the document FR-A-2 684 151.

That mechanism is designed to compensate for wear in the friction liners 83, and to maintain the diaphragm in a substantially constant position when the clutch is engaged. This mechanism includes a wear detector which, when wear is detected, governs a system of ramps and counter ramps which are interposed either between the base of the cover plate and the primary abutments, or between the boss of the pressure plate and the pressure plate.

For more detail, reference should be made to the said document FR-A-2 684 151, and in particular to FIGS. 36 and 37 of the latter.

In this example the flywheel 5, 6 is fixed directly on the crankshaft 2. In another version, the flywheel 5, 6 may be fixed on a hub which is coupled elastically to the crankshaft of the engine of the vehicle, in the manner described in the document EP-A-0 464 997, to which reference should be made.

In that case, the hub is mounted for rotation through an interposed bearing on a first mass which is fixed to the crankshaft, the flywheel 5, 6 being part of a second mass.

In all cases, the flywheel 5, 6 is a torque transmission flywheel which is coupled in rotation to the engine of the vehicle and which is mounted in the drive train which goes from the engine to the motion transmitting unit, and in this example to the wheels of the vehicle.

In the manner mentioned above, the flywheel comprises a flexible disc 5, which has, firstly at its inner periphery a first portion 51 for coupling the disc in rotation with the crankshaft 2, that is to say with the engine shaft, and secondly, at its outer periphery, a second portion 53 for supporting and fastening the reaction plate.

In this example the flexible disc is press-formed as in the document EP-A-0 464 997 mentioned above. The second portion 53 is offset axially with respect to the first portion 51, towards the base portion 115 of the cover plate 11, that is to say away from the crankshaft.

The disc 5 extends at right angles with respect to the axis X—X, and is accordingly oriented transversely like the friction faces 60, 90. The first portion 51 and the second portion 53 are oriented transversely and are parallel to each other.

An intermediate portion 52, oriented transversely, extends axially between the two portions 51, 53 and is joined, firstly to the first portion 51 through a first inclined zone 54, and secondly to the second portion 53 through a second inclined zone 55. The zones 54, 55 are inclined in the same direction.

An annular ring 57 is secured, in this example by seaming, to the first portion 51. This ring 57 is centred by the portion 51 which, for this purpose, has at its inner periphery an axially oriented sleeve portion (not given a reference numeral). The said ring 57 serves as an abutment for the heads of fastening screws 56 which pass through passages in axial register which are formed in the portion 51 and the ring 57, to be screwed into the crankshaft 2.

The ring 57 constitutes a pressure ring, such that the portion 51 is gripped between the crankshaft 2 and the ring 57.

In another version of course, the heads of the screws may bear on the first portion 51 through a washer for preventing loosening of the screws, the ring 57 being omitted.

Similarly, the second portion 53 is assembled to the reaction plate 6 by means of screws 58, the second portion being pinched between the heads of the screws 58 passing through the portion 53 by virtue of passages for that purpose so that they can be screwed into the plate 6, and the reaction plate 6.

The portions 53, 51 are offset radially, with the second portion 53 being located at the outer periphery of the reaction plate 6.

The skirt 116 of the cover plate may of course be assembled to the disc 5, and the reaction plate may be assembled by riveting to the second portion 53.

In another version and as described in the document FR-A-2 740 188, each of the screws 58 has a head which is received in a seating open in the friction face 60, and the threaded portion of the screws 58 is screwed into a thread formed in the second portion 52.

Through holes are then formed in axial register in the liners 82, the support 81, the plate 9, the diaphragm 10 and the base portion 115 of the cover plate, so as to enable access to be obtained with the aid of a tool to the heads of the fastening screws 58.

Similarly, through holes may be formed in axial register in the fingers 102 of the diaphragm 10 and the disc 8 so as to give access to the heads of the fastening screws 56.

In general terms, the screws 56, 58 may be replaced by rivets or other fasteners, and the structures may be reversed, so that the thread for receiving the screws may be formed in the portions 51, 53 or, respectively, in the crankshaft 2 and the reaction plate 6.

A single large central bolt may be used for assembly of the disc 5 to the crankshaft 2, and may serve to support the bearing 40.

The portion 53 may have lugs which are anchored in the reaction plate 6 with holes or projections for improving the anchoring effect, so that the presence of the fastening members 58 is not obligatory.

In another version, the portions 51 and 53 may be joined together through a frusto-conical portion.

In general terms in the light of the documents FR A-2 740 188 and DE-A-43 09 570, it will be seen that the reaction plate 6, the friction disc 8 and the clutch mechanism 9, 10, 11 can constitute a unitary module which can be attached on the disc 5.

The cover plate 11 can accordingly be fixed in a non-detachable manner on the reaction plate 6. It can also be fixed detachably on the reaction plate 6.

Figure 3:
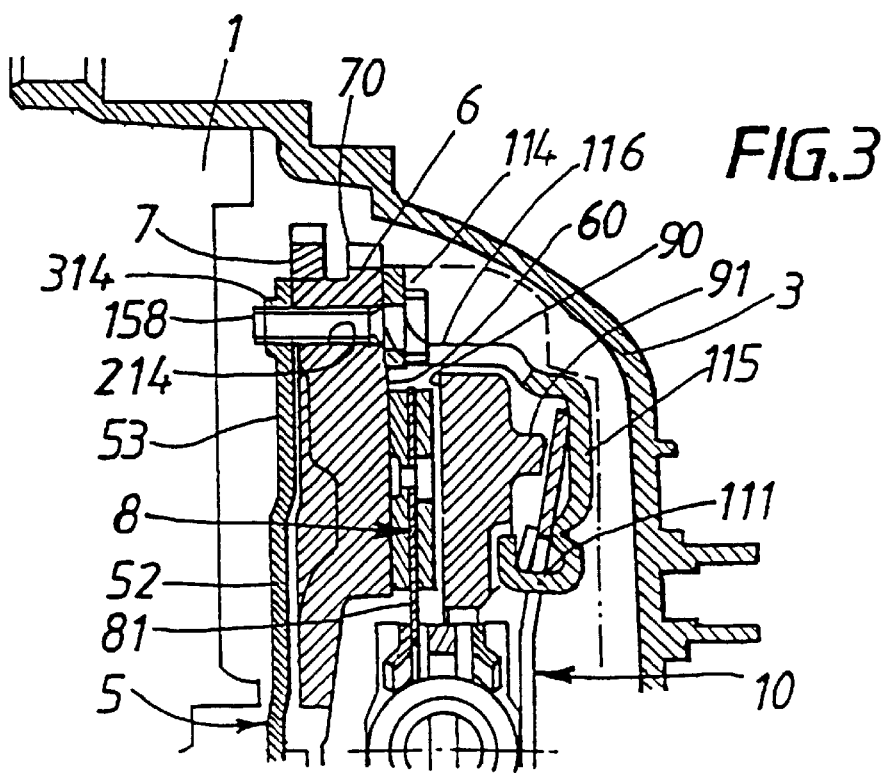
FIG. 3 is a partial view in cross section showing the clutch in a second embodiment.

In order to avoid the presence of fastening screws passing through the cover plate 11, the diaphragm 10, the pressure plate 11, the disc 8 and the reaction plate 6, it is possible to proceed as shown in FIG. 3.

Thus, the cover plate 11 has a flange 114 with two sets of holes, namely a first set of holes as in FIG. 1 for fastening the cover plate on the reaction plate 6 in the manner described above with the aid of a first set of screws. A second set of holes enables a second set of fastening screws 158 to pass through, extending through a passage 214 formed in the reaction plate, so that they are screwed into a female thread 314 formed in the disc 5 in axial register with the passage in the plate 6 and the hole in the flange 114.

The female thread may be provided by a nut welded on the disc.

So, the unitary module consisting of the reaction plate and the clutch mechanism is delivered, with the friction disc being inserted between the plates 9 and 6, and this module, including the friction disc, is then fixed on the disc 5 by means of the second set of screws, which may be replaced by other fastening members such as rivets, bolts etc.

The screws 58 and the associated female threads in the plate 6 are therefore omitted, so that the latter is thereby made stronger. In addition, both sets of screws are screwed in the same direction.

In another version, the reaction plate may be welded, adhesively bonded, seamed, snap-fitted, force-fitted etc. on the disc, because the disc 5 is fixed in advance on the crankshaft and the clutch mechanism can be dismantled without weakening its components, 9, 10, 11 or the disc 8 and the reaction plate 9.

In accordance with a major feature, when the clutch is disengaged (i.e. in the declutching operation), the diaphragm 10 bears on the secondary abutment 102, and this results in a reaction on the disc 5, which tends to approach the second portion 53 with respect to the first portion 51. The disc 5 therefore exerts an elastic action against the declutching force which, in this example, is directed towards the reaction plate 6, and this is beneficial.

By contrast, in the document EP-A-0 464 997, the opposite is true, the clutch being of the pull-to-release type. Accordingly, the second portion is moved away from the first portion, which runs a risk of deforming the disc.

Thanks to the portion 52 and the inclined zones 54, 55, or, in a modified version, the frusto-conical connection portion between the portions 51, 53, the disc 5 offers elastic resistance during the disengagement of the clutch, which favours absorption of the vibrations which are generated by the internal combustion engine.

An auxiliary spring, for example a Belleville ring, may of course be associated with the diaphragm, with this ring working either in series or in parallel with the diaphragm.

The clutch engaging means may accordingly include two Belleville rings.

The clutch disengaging means may of course consist of separate declutching levers, and the clutch engaging means can consist of coil springs.

The clutch may have two friction discs and accordingly an intermediate internal pressure plate.

In general terms, and as described in the document FR-A-1 257 799, thanks to the flexible disc 5, the pressure plate 9 and reaction plate 6 are dissociated from the flexing oscillations which can be performed by the end of the engine shaft (that is to say the crankshaft 2), and noises disappear.

The disc does not have some arbitrarily chosen value of flexibility, but the latter is such that, having regard to the inertia of the clutch, the natural frequency of the assembly will lie in the range between fifty and two hundred hertz, and more particularly in this example it is close to 100 hertz for a touring vehicle.

For this first frequency, a flexing movement is produced in the disc, this movement being reduced here, and more precisely a nutation movement about its diameter.

Tests have shown that the disc equipped with the plates 6, 9 will vibrate axially at a second frequency higher than the first. Impacts can therefore be produced between the disc 5 and the pressure plate.

In general terms, detrimental coupling can occur between the two frequencies.

Tests have shown that, for certain ratios between the second frequency F2 and the first frequency F1, these noises and disadvantages do disappear.

Thus, in accordance with the invention the ratio F2/F1 is greater than or equal to 1.5, and the noise is eliminated.

In one embodiment the first frequency F1 is equal to 100 Hz and the second frequency to 150 Hz.

The first frequency F1 is a bending frequency and the second frequency F2 is a pumping frequency, and is for example less than 200 Hz.

This does of course depend on applications, and the frequency F2 in respect of the ratio according to the invention can be greater than 200 Hz.

Thanks to the invention coupling of the frequencies F1 and F2 is avoided.

The clutch and the disc 5 are of course chosen so as to displace the bending frequency generated by the crankshaft beyond the working range of the vehicle, as described in the document EP-A-0 385 752. This frequency is for example 900 Hz, which is beyond the zone of 200 to 500 Hz.

Thanks to the invention, during operation of the clutch the disc is rigid enough for the frequencies F1 and F2. In addition, the form of the disc enables it to work against the declutching force and to offer elastic resistance.

Where the clutch is of the pull-to-release type, it is necessary to offset the second portion 53 axially towards the crankshaft 2.

As described in the document FR-A-2 684 151 (FIG. 37), friction may occur between the inner periphery of the reaction plate 6 and the outer periphery of the annular ring 57; a friction ring is for example interposed between the said peripheries.

All combinations may be envisaged.

Thus the flexible flywheel may be part of a double damped flywheel as described in the document EP-A-0 464 997, to form the first mass of the latter, being secured directly to the crankshaft.

The association of a disc with friction liners not secured by riveting on the support 81, and being for example of the type described in the document FR-A-2 652 397, in association with a wear compensating mechanism, enables the diaphragm to work always in the same position, and therefore, for transmission of a given torque, to allow more wear in the friction liners 82, all of this being achieved without increasing the inertia of the friction disc, because of the rivetless fastening. The useful thickness of the friction liners is greater.

In addition, the wear compensating device is less sensitive to vibrations.

As a result of this, the useful life of the clutch is increased.

The flexible flywheel according to the invention also enables the useful life of the clutch to-be increased because the components of the latter are protected.

The association with a double damped flywheel of the type described in the document EP-A-0 464 997 mentioned above is also beneficial.

The clutch may accordingly include a double damped flywheel equipped with a flexible flywheel according to the invention in association with a wear compensating device and a friction disc having friction liners which are not secured by rivets on its support, which may be doubled up, this disc being coupled for example rigidly to the hub 83.

The clutch is thus able to have a long useful life, to absorb vibrations well due to its double flywheel, and to be silent because of its double flywheel and its flexible flywheel protecting the components of the clutch.

The wear compensating device can of course be incorporated in the flexible flywheel in the manner described for example in the document FR-A-2 722 852.

Control of the clutch release bearing may be of the hydraulic type.

Figure 2:
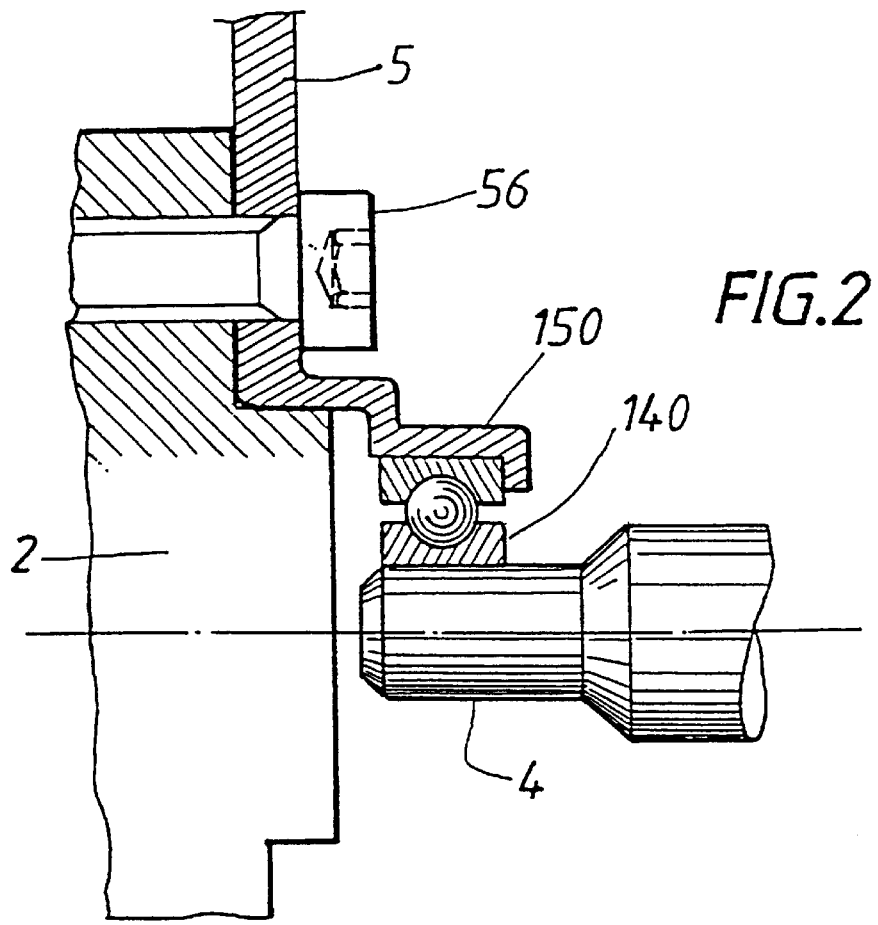
FIG. 2 is a partial view in cross section, showing the centre of the clutch in another version.

As can be seen in FIG. 2, the disc 5 may be extended centrally in the axial position by a stepped sleeve portion 150 which carries an internal pilot bearing 140 for the shaft 3. The rolling bearing 140 replaces the ball bearing 20 and enables the crankshaft 2 to be simplified and the end of the shaft 3 to be centred. The sleeve portion extends towards the cover plate 11.

What is claimed is:

1. A friction clutch for acting between an internal combustion engine and a torque transmission unit, and including a flexible torque transmitting flywheel (5, 6) comprising a flexible disc (5) with, at its inner periphery, a first portion (51) for coupling the flexible disc (5) to a shaft of the internal combustion engine for rotation therewith, and at its outer periphery a second portion (53) for supporting a plate (6) of the clutch, in which the friction clutch has, below 200 hertz, a first resonant frequency (F1) and a second resonant frequency (F2) which is higher than the first resonant frequency (F1), wherein a ratio of said second resonant frequency relative to said first resonant frequency is at least 1.5.

2. A clutch according to claim 1, wherein the first resonant frequency (F1) is close to 100 hertz.

3. A clutch according to claim 2, wherein the second resonant frequency is less than 200 hertz.

4. A clutch according to claim 1, wherein the second portion (53) of the flexible disc is offset axially with respect to the first portion (51), and in that the flexible disc (5) is configured between its two portions (51, 53) in such a way as to work against the declutching force.

5. A clutch according to claim 4, wherein the clutch is of the push-to-release type, and in that the second portion (53) is offset axially with respect to the first portion (51) in a direction away from the internal combustion engine.

6. A clutch according to claim 4, wherein the second portion (53) is joined to the first portion (51) through a portion of frusto-conical form.

7. A clutch according to claim 4, wherein an intermediate portion (52) is interposed axially between the first portion (51) and the second portion (53), and in that the intermediate portion (52) is joined, firstly at its inner periphery to the first portion (51) by a first inclined zone (54), and secondly at its outer periphery to the second portion (53) by a second inclined zone (55), and in that the inclined zones (54, 55) are inclined in the same direction.

8. A clutch according to claim 1, wherein the first portion (51) of the flexible disc (5) is fixed on the crankshaft (2) of the internal combustion engine.

9. A clutch according to claim 1, wherein the first portion (51) of the disc is flexible and fixed on a hub which is coupled elastically to the crankshaft by a first mass, and in that a bearing is interposed between the hub and the first mass.

10. A clutch according to claim 1, wherein the flexible disc (5) is extended in length centrally by a sleeve portion (150) which carries an internal rolling pilot bearing (140).

11. A clutch according to claim 1, wherein it comprises a clutch module including the reaction plate (6), a friction disc (8) having friction liners (83) interposed between the reaction plate (6) and a pressure plate (9), which is fixed in rotation to a cover plate (11) secured on the reaction plate (6), and in that the module is attached on the flexible disc (5).

* * * * *